(12) United States Patent
Akhteruzzaman et al.

(10) Patent No.: US 6,393,104 B1
(45) Date of Patent: May 21, 2002

(54) ENHANCED LIFE-LINE SERVICE FOR CABLE TELEPHONE CUSTOMERS

(75) Inventors: Akhteruzzaman, Naperville; Paul Raymond Sand, Woodridge, both of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/397,563

(22) Filed: Sep. 16, 1999

(51) Int. Cl.[7] .............................................. H04M 11/00
(52) U.S. Cl. ..................... 379/37; 379/93.07; 379/90.01
(58) Field of Search .......................... 379/93.07, 90.01, 379/211, 37, 39, 45; 370/216, 221, 225; 725/106, 108, 109, 110

(56) References Cited

U.S. PATENT DOCUMENTS

| | | | |
|---|---|---|---|
| 5,034,948 A | * 7/1991 | Mizutani et al. | 379/93.07 |
| 5,999,612 A | * 12/1999 | Dunn et al. | 379/212 |
| 6,029,047 A | * 2/2000 | Ishida et al. | 379/93.07 |
| 6,064,727 A | * 5/2000 | Levy | 379/221 |

* cited by examiner

Primary Examiner—Stella Woo
(74) Attorney, Agent, or Firm—Werner Ulrich

(57) ABSTRACT

An arrangement for enhancing the capabilities of emergency service provisions for telephone stations served by a cable system. In accordance with the prior art, telephone stations served by cable systems are frequently provided with access to an emergency telephone line for making emergency calls when the cable system lacks power, or is otherwise inoperative. In accordance with this invention, the emergency service line is used for making incoming calls directed to all telephones connected to the emergency line, using a different telephone number for the emergency call. Outgoing service is also provided to the telephones connected to the emergency line. Advantageously, the value of the emergency line service is substantially enhanced.

4 Claims, 2 Drawing Sheets

ENHANCED LIFE-LINE SERVICE FOR CABLE TELEPHONE CUSTOMERS

TECHNICAL FIELD

Figure 1:
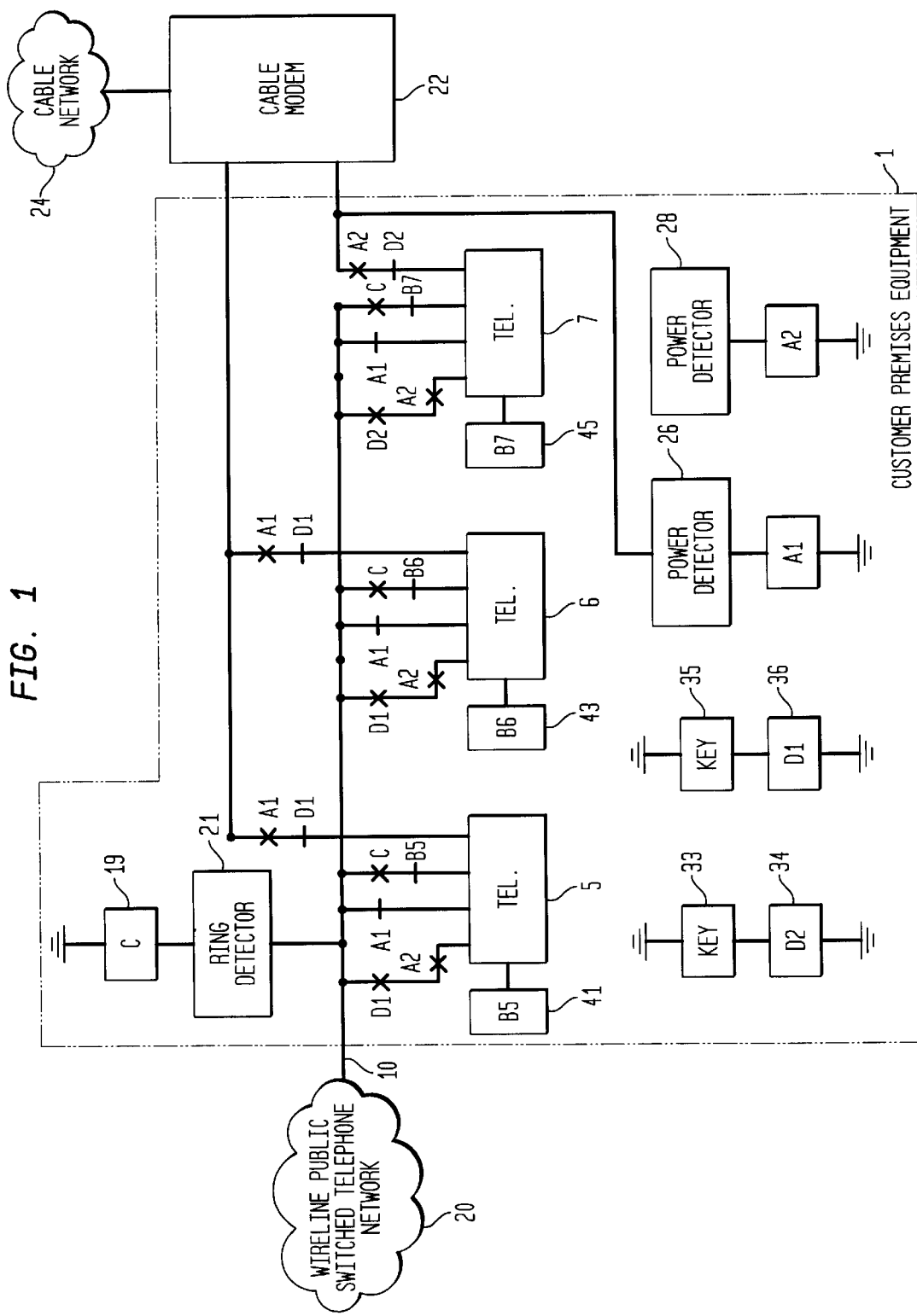

This invention relates to emergency type service for telephone customers served by cable systems.

PROBLEM

Telephone service has become a vital service. It is required for access to the emergency services offered through "911" emergency systems. It is a vital link to elderly people whose relatives check on their health by calling them periodically. In particular, one of the important characteristics of older telephone systems is that they work even in the presence of a power failure in an area. During some of the more notorious blackouts of recent years, people were still able to communicate through the telephone network.

The integrity of the telephone network in the presence of power failures is being compromised by the use of cable systems for providing telephone service. Users of these cable systems require the use of a working modem which is powered by commercial power. Customers served by cable systems, therefore, have the option of doing without vital telephone service when power fails, using cellular telephones to bypass the cable system, or receiving back-up service from a conventional wire-line Public Switched Telephone Network of the type that provides its own power, and will serve customers even if those customers are not receiving commercial power.

A problem of prior art systems which provide back-up through the use of the wire-line Public Switched Telephone Network (PSTN), is that the back-up service uses expensive facilities to solve a problem, (power failure), that occurs relatively infrequently.

SOLUTION

Applicants have analyzed this problem, and have sought to find additional uses for the back-up wire-line PSTN. In accordance with their invention, they have made an advance over the prior art by disclosing a system for utilizing the back-up PSTN to simultaneously access all idle telephones in a home or commercial establishment having a plurality of telephones associated with a plurality of telephone numbers; the back-up PSTN has a single telephone number for reaching all of these telephones. If a caller calls, using the telephone number of the back-up wire-line PSTN, that caller, with or without power failure, will be connected to the telephones of the called household or commercial establishment in such a way that all telephones will ring and any one of them can be answered. Advantageously, this arrangement allows individual access to the telephones through the cable system, and group access to the telephones through the wire-line Public Switched Telephone Network.

In addition, the telephones are equipped with a key to allow them to originate calls to the PSTN for emergencies.

BRIEF DESCRIPTION OF THE DRAWING(S)

Figure 2:
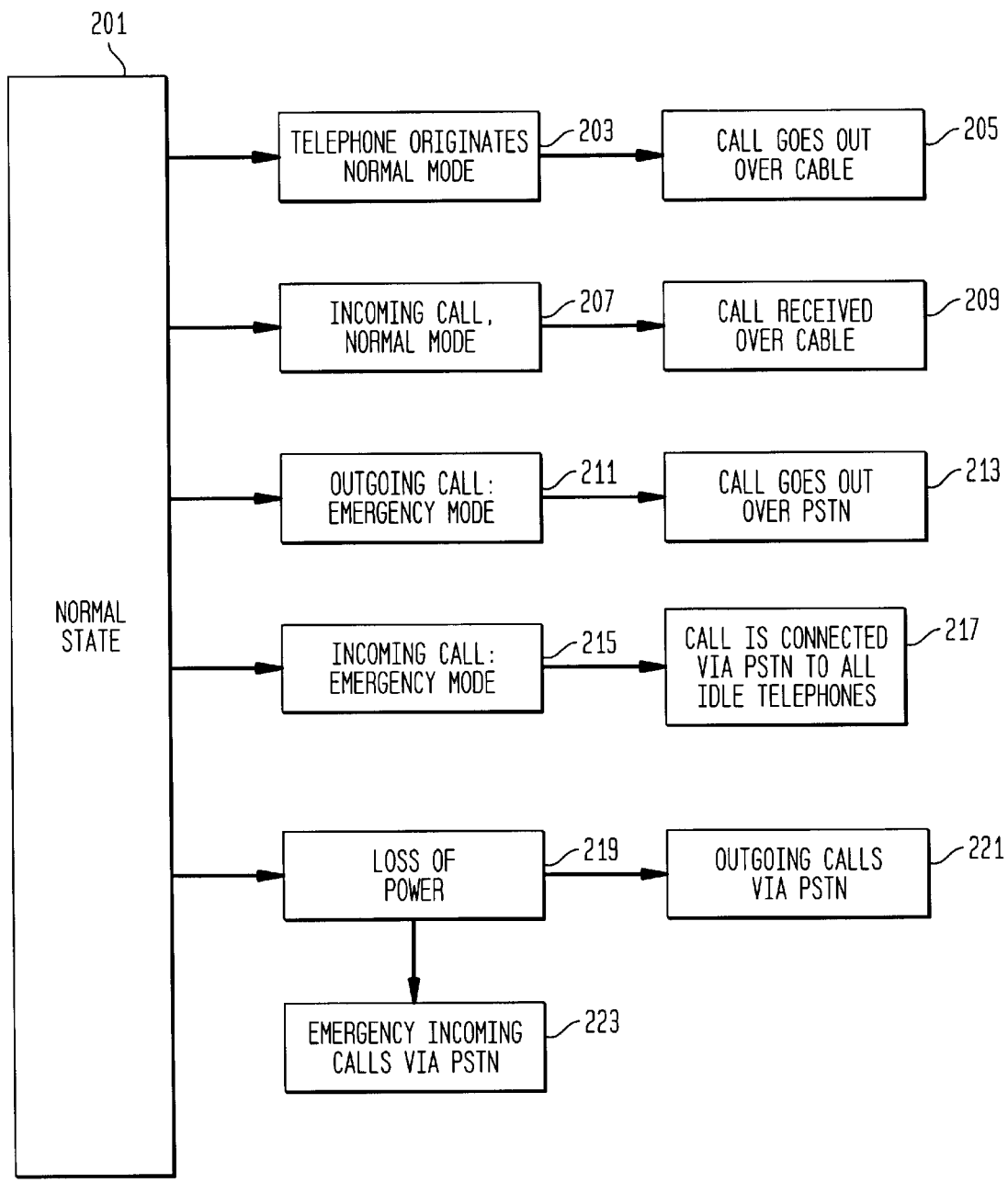

FIG. 1 is a block diagram, illustrating the overall architecture of Applicants' system; and FIG. 2 is a flow diagram, illustrating an incoming call from the wire-line Public Switched Telephone Network.

DETAILED DESCRIPTION

FIG. 1 is a block diagram, illustrating the overall operation of Applicants' invention. The telephones in a household or commercial establishment are grouped into an entity 1. Two lines, one for serving stations 5 and 6, the other for serving station 7 are provided. The entity includes power detectors 26 and 28, which operate 27 and 29 29, (Relays A1 and A2), respectively. When a power detector detects the presence of power, the corresponding A Relay is operated and the telephone stations of each line are each connected through a contact of the A Relay to a separate input to a cable modem 22, connected to a cable network 24. When the power detector no longer detects the presence of commercial power, A Relays 27 and 29 automatically release, and the connections of the telephones to the cable modem 22 are disconnected. Each of the telephones is then connected by a release contact of its corresponding A Relay to a line 10 to a wire-line Public Switched Telephone Network 20. Any of the telephone stations 5, 6, 7, of unit 1, can then access line 10 in order to access wire-line PSTN 20. This provides outgoing service when there is a power failure, since the telephone stations and the wire-line Public Switched Telephone Network operate in the conventional manner of prior art telephone systems when there is no power.

In accordance with Applicants' invention, an incoming call may be received from the wire-line PSTN 20 at any time, whether or not there is a power failure. Telephones 5, 6, and 7, each have an associated B Relay 41, 43, 45, respectively, that is operated when the telephone station is off-hook. A ringing detector 21 attached to line 10, which is connected to the wire-line PSTN 20, detects the incoming call, and when it does so, operates C-Relay 19. When C-Relay 19 is operated, all of the telephones which are in the idle state, (B-Relay released), will be connected to line 10 and rung.

FIG. 2 is a flow diagram, illustrating the operation of Applicants' invention. Originally, all the telephones are in the normal state, (Action Block 201). If a telephone originates in the normal mode, (Action Block 203), the call goes out over cable, (Action Block 205). If an incoming call is received in the normal mode, (Action Block 207), the call is received over cable, (Action Block 209). If an outgoing call is made in the emergency mode, (Action Block 211), the call goes out over the Public Switched Telephone Network (PSTN), (Action Block 213). The emergency mode can be invoked by operating the DT, which operates the corresponding D Relay. If an incoming call is received in the emergency mode, (Action Block 215), this call is connected over the PSTN to all idle telephones, (Action Block 217). Such a call is made to a different telephone number; the telephone number being associated with the entire customer premises equipment 1. If a loss of power is detected, (Action Block 219), then outgoing calls are placed over the PSTN, (Action Block 221), and emergency incoming calls can continue to be received over the PSTN, (Action Block 223).

Additionally, if a power loss is detected, incoming calls to the directory numbers assigned to the cable system are automatically forwarded to the directory number of the PSTN line. The network can infer that a power loss has occurred by monitoring the commercial power source at the optical network unit in the neighborhood, (which is likely to be on the same power grid). When power is lost, the cable network terminating system initiates a call forwarding request to a switch serving the cable network terminating system. That switch then routes calls to the cable directory numbers through the PSTN to the PSTN directory number of the line. When power is restored and the cable modem register with the cable network terminating system through its normal initialization sequence, the call forwarding to the PSTN directory number is disabled, and incoming calls for cable directory numbers are delivered via the cable system.

The above description is of one preferred embodiment of Applicants' invention. Many other arrangements will be apparent to those of ordinary skill in the art, without departing from the scope of Applicants' invention. Applicants' invention is only limited by the attached Claims.

What is claimed is:

1. Apparatus for providing back-up service to a plurality of telephones of Customer Premises Equipment of one customer premises served by a cable system comprising:

means for serving said plurality of telephones from said cable system;

said plurality of telephones further served by a single line to a wire-line Public Switched Telephone Network; and means for connecting an incoming call received over said line to any idle one of said plurality of telephones;

wherein said plurality of telephones are served from said cable network by at least two telephone numbers;

wherein disjoint sets of said telephones of said Customer Premises Equipment of said one customer premises are served by different telephone numbers; and wherein a telephone number, different from telephone numbers used for accessing said plurality of telephones from said cable system, is used for accessing said telephones from said wire-line PSTN.

2. The apparatus of claim 1, comprising means for permitting said plurality of telephones to make emergency calls over said single line to said PSTN.

3. The apparatus of claim 1, comprising means for permitting said plurality of telephones to make calls over said single line to said PSTN when power is not available for said cable system.

4. The apparatus of claim 1, further comprising:

means for forwarding calls directed to a telephone number served by said cable system to said telephone number used for accessing said telephones from said wire-line PSTN.

\* \* \* \* \*